United States Patent
Erdmann et al.

(10) Patent No.: US 9,992,727 B2
(45) Date of Patent: Jun. 5, 2018

(54) METHOD FOR MANAGING A PROXY TABLE IN A WIRELESS NETWORK USING PROXY DEVICES

(71) Applicant: PHILIPS LIGHTING HOLDING B.V., Eindhoven (NL)

(72) Inventors: Bozena Erdmann, Aachen (DE); Koen Johanna Guillaume Holtman, Eindhoven (NL); Armand Michel Marie Lelkens, Heerlen (NL); Esko Olavi Dijk, Utrecht (NL); Ludovicus Marinus Gerardus Maria Tolhuizen, Waalre (NL); Bas Willibrord De Wit, Dordrecht (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 14/376,446

(22) PCT Filed: Feb. 7, 2013

(86) PCT No.: PCT/IB2013/051001
§ 371 (c)(1),
(2) Date: Aug. 4, 2014

(87) PCT Pub. No.: WO2013/121325
PCT Pub. Date: Aug. 22, 2013

(65) Prior Publication Data
US 2015/0043428 A1   Feb. 12, 2015

Related U.S. Application Data

(60) Provisional application No. 61/599,599, filed on Feb. 16, 2012.

(51) Int. Cl.
*H04W 40/24* (2009.01)
*H04L 12/741* (2013.01)
(Continued)

(52) U.S. Cl.
CPC .......... *H04W 40/242* (2013.01); *H04L 45/54* (2013.01); *H04W 84/18* (2013.01); *H04W 88/182* (2013.01)

(58) Field of Classification Search
None
See application file for complete search history.

(56) References Cited

U.S. PATENT DOCUMENTS

2003/0202505 A1* 10/2003 Ozugur ............. H04L 29/12009
370/352
2008/0056261 A1* 3/2008 Osborn ............... H04L 12/2834
370/392
(Continued)

FOREIGN PATENT DOCUMENTS

CN         101582846 A      11/2009
JP         2010503276 A      1/2010
(Continued)

*Primary Examiner* — Huy D Vu
*Assistant Examiner* — Teisha D Hall
(74) *Attorney, Agent, or Firm* — Meenakshy Chakravorty

(57) ABSTRACT

The invention relates to a proxy node comprising means for managing a proxy table, a receiver for receiving a message from a first resource restricted device, said message being intended to at least one corresponding destination device, control means for checking whether an entry for the first resource restricted device is included in the set of entries of the proxy table, the set of entries of the proxy table indicating the set of resource-restricted devices the proxy node is in charge of, a transmitter for forwarding the message depending on the result of the proxy table checking, the means for managing the proxy table being arranged for cleaning the proxy table of the entry relative to the resource-restricted device by monitoring the relative usage of the proxy node for forwarding messages for the resource restricted device with the usage of competitor proxy nodes for forwarding messages for the resource restricted device.

17 Claims, 1 Drawing Sheet

(51) Int. Cl.
 *H04W 84/18* (2009.01)
 *H04W 88/18* (2009.01)

(56) References Cited

U.S. PATENT DOCUMENTS

2008/0159289 A1\* 7/2008 Narayanan .......... H04L 61/2061
 370/392
2012/0002547 A1 1/2012 Picard

FOREIGN PATENT DOCUMENTS

WO 2010092530 A1 8/2010
WO 2011070479 A1 6/2011

\* cited by examiner

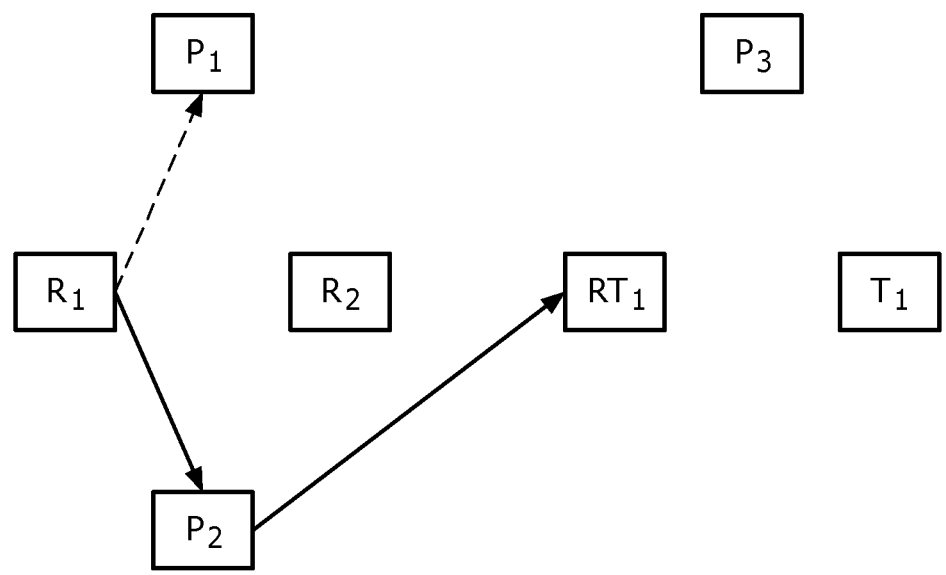

METHOD FOR MANAGING A PROXY TABLE IN A WIRELESS NETWORK USING PROXY DEVICES

CROSS-REFERENCE TO PRIOR APPLICATIONS

This application is a U.S. national stage application under 35 U.S.C. § 371 of International Application No. PCT/IB2013/051001, filed on Feb. 7, 2013, which claims priority benefit under 35 U.S.C. § 119(e) of U.S. Provisional Application No. 61/599,599 filed on Feb. 16, 2012, the contents of which are herein incorporated by reference.

FIELD OF THE INVENTION

The present invention relates to communication networks comprising a plurality of nodes. In particular, some nodes may be resource restricted and have to communicate efficiently with the other nodes. To do so, proxy nodes operates as relay nodes to forward the messages from the resource restricted nodes to their targets or destination nodes.

This invention is, for example, relevant for networks comprising ZigBee Green Power nodes.

BACKGROUND OF THE INVENTION

In wireless network resource-restricted devices can be used, such as energy-harvesting devices. Such devices are heavily restricted in the available amount of energy, thus limited in the offered functionality and influencing the network operation, commissioning and maintenance.

One example of such technology is the standard in the making, ZigBee Green Power.

If the restricted device is out of range of the device it is configured to control (referred to as a target), an intermediate device does forward (referred to as a proxy). The wireless links between the proxy and the restricted device may appear and disappear during network lifetime, e.g. due to changes in propagation or in relative location of devices. For system security and performance reasons, the proxies only forward for devices they have a table entry for, e.g. to be able to perform freshness or security check. For communication reliability, preferably more than one proxy does forward on behalf of each restricted device.

There are various ways to establish/extend such proxy entry, automatically or on user request. However, the currently available methods for entry removal require user involvement, via commissioning tool usage and/or manual interaction with the restricted/controller device (potentially installing up in the ceiling), which is cumbersome for large-scale network, such as building automation networks.

However, due to the scale of the network and the automatic proxy table creation, there is a need for automatic proxy table cleaning. However, due to the unforseeable schedule of transmissions by the restricted device (which may be dependent on the amount of available energy and/or user interaction) and the unreliable nature of the wireless transmissions, esp. from the restricted device, potentially not using ACKs and channel access procedures (such as CSMA/CA), simple aging (e.g. Remove entries that will expire soonest, Remove entries that were created earliest, Remove entries that were used least) is not appropriate for the restricted devices.

Right now in the ZGP specification, it is up to the proxy implemented to choose some cleaning heuristics, i.e. to choose heuristics that pick an entry to delete from a full proxy table if a new entry must be added. There can be some level of freedom for proxy implementers, because though bad heuristic reduces network efficiency and reliability, a bad heuristic cannot lead to long-lasting failure of the network.

The object of this invention is to add (mandatory) protocol elements that can be used to improve table cleaning heuristics in proxies. More efficient heuristics will lead to a faster and more reliable network.

In the current ZGP specification there is no performance penalty for proxies having a very full proxy tables: so aggressive cleaning to shrink a table much below the size of the available memory in a proxy has no beneficial effect.

The current ZGP spec offers the following mechanisms for Proxy Table Maintenance.

Proxy Table entry establishment:
  in the commissioning process (likely with user involvement), when the target or a commissioning tool sends a control announcement (ZGP: ZGP Pairing command with AddSink flag set to 0b1), informing the proxy(s) about the new control relationship created, incl. the identifier of the restricted device and the corresponding target(s); it can be send in (range-limited) broadcast, with the proxy(s) optionally adding the table only if they are in the range of the limited device, esp. if the device indicates fixed location;
  during operation,
    by proxy receiving an unsolicited control announcement;
    by proxy receiving communication from an unknown restricted device and seeing other proxy(s) forwarding it
    by proxy receiving communication from an unknown restricted device and making a query for control relationships (ZGP: ZGP Pairing Search command or broadcast ZGP Notification command).
Proxy Table Entry Removal:
  reception of the Decommissioning GPDF from the restricted node in commissioning mode (specially triggered on the restricted node)
  reception of a control removal command (ZGP: ZGP Pairing with AddSink flag set to 0b0 or with RemoveZGPD set to 0b1), specially triggered on the target/commissioning tool.
The following proxy operations are further automatically performed:
  upon receiving forwarded communication, the first-to-forward flag is cleared;
  upon receiving a request to send to the restricted device (ZGP: ZGP Response) with another proxy being nominated, it clears the first-to-forward flag and removes any packets queued for the delivery to this restricted device.

A resource restricted device may be for example a ZigBee Green Power Devices (ZGPDs) or the like, which do not have a battery or only small storage capacity and can receive only at unscheduled opportunities. For example, a ZGPD can be a battery-less switch that can only receive for a short time once it is actuated by a user and has transmitted its signal. Another example of a ZGPD is a periodically-reporting sensor, harvesting energy from its environment, e.g. by means of a photovoltaic cell.

SUMMARY OF THE INVENTION

It is an object of the invention to propose a method to manage efficiently the proxy table of a proxy node.

It is another object of the invention to achieve one or more of the following goals:
1. Removal of stale proxy table entries.
2. Proxy table overflow avoidance
3. Avoiding that too many active proxies per restricted device (in dense networks)
4. Guaranteeing of having at least a single proxy per restricted device (in dense networks)
5. Guaranteeing optimal proxy reliability, according to the application requirements (e.g. importance and rt requirements)

To this end, it is proposed methods and devices as defined in the appended claims.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 1 is a block diagram of a network in which the invention is implemented

DETAILED DESCRIPTION OF THE INVENTION

Detailed Problem Statement
Consider a wireless mesh network containing
  One or more restricted devices R that are restricted in their ability to send many or long wireless packets, and restricted in their ability to listen for packets over long time periods or receive at all. For example: devices powered by energy scavenging mechanisms. Restricted devices can send messages by putting them into packets and sending them.
  One or more target devices T that should receive messages from restricted devices R, where messages may be encoded into one or more packets, and the encoding of the message in a packet may change on a hop-by-hop basis
  One or more proxy devices P that help deliver messages from restricted devices beyond the (radio) range of the restricted devices, and/or help delivering them in the required message format and/or more reliably, by taking special actions when they receive a packet from a restricted device. An example of such a special action is delivering the message onwards to a target T. Proxy devices typically have more power than the restricted devices so they can do additional message processing, use different message formats with longer messages, do re-try actions or route discovery actions on behalf of the restricted device, etc.
  Optionally, one or more Router devices RT that cannot act as a proxy device, but that can route messages sent by proxy device towards a target device.

We call this a 'mesh' network to indicate that there is at least one device that is capable of acting as a relay for a message.

A single device may act as both a target device and proxy device, and also as a router device.

A typical network topology is shown in FIG. 1. The arrows in the FIGURE show packets that are sent and received to deliver a message from R1 to T1. The dotted arrow indicates that, in this example, the original packet sent by R1 is also received by P1, but P1 does not act on it. There are several (known) techniques by which P1 and P2 can coordinate to prevent the wasteful action of them both forwarding the packet. Such techniques are incorporated for example in the upcoming ZigBee Green Power standard.

FIG. 1 shows that both P1 and P2 are proxies that are in-range of R1. There are several reasons why it can be beneficial to have a system design in which multiple in-range devices can work as proxies for R1:
  1. Reliability. For each message $M_1$, R1 may only have limited energy with which the send packets containing the message. For example, R1 may only be able to send 2 packets encoding the message within a very short time window (e.g. defined by the availability of the harvested energy); it also may not be able to perform the required channel access mechanisms and/or wait to receive an acknowledgement frame, all of which may negatively influence communication reliability. In that case, having more proxies around R1, who will all listen for and also be able to forward packets from R1, increases the chance that at least one proxy will receive the packet with $M_i$.
  2. Mobility. If R1 can move around, it may move out of range of any single proxy, the proxy may be moved/switched off or the propagation conditions can change (e.g. due to temporary or permanent space rearrangements).
  3. Avoid configuration of a restricted device. It may not be possible or desirable to configure the restricted device R1 to hold the network address of a single proxy device. Any message packet sent by R1 will therefore automatically be a broadcast/multicast packet, addressed to all proxy-capable devices (in-range).

Our invention applies especially to systems with the capability to have multiple proxies for each restricted device R1.

In such systems, it is beneficial for speed, efficiency, and reliability if proxies can contain 'state information' about restricted devices. Example of such 'state information' applicable to a single restricted device R1 are
  1. Addresses (identities) of the target device (or devices) for certain messages from R1, in case R1 cannot or does not embed this information in its message packets
  2. Information that makes communication from or to R1 more secure, e.g. the encryption key used by R1, the security frame counter recently used by R1 (frame counters can protect against replay attacks and/or are used as initialization vectors for the key)
  3. A message that needs to be sent to R1 as soon as R1 powers up its radio and sets it to receive such messages. (Typically an energy-scavenging node R1 might power up its radio and set it to receive mode for a short while after it has sent a message packet)

For the purpose of this invention, we define the 'proxy table' as a data structure in a proxy that holds information about, or for, one or more restricted devices. A proxy table can contain information for many different restricted nodes Rx.

Thus, in such a system, the proxy table entries need to be created, maintained and used for forwarding the communication of the restricted device, and potentially also removed.

For example, in FIG. 1, it would be beneficial if both P1 and P2 would store information for R1 in their proxy tables. In case that R1 may move around, it is also beneficial if P3 would store that information. However, in most envisaged mesh networks the memory in proxy nodes is limited, so it will not always be possible to store information about all restricted nodes Rx in all proxy tables of all proxy (capable) nodes Px.

A proxy node Px that currently does not have any information about a restricted node R1 in its proxy table may still choose to start working as a proxy for that node. We can therefore distinguish two types of proxies surrounding a node Rx:

Early action capable proxies, who have information about Rx in their proxy tables Late action capable proxies, who have no information (yet) about Rx in their proxy tables at the moment that they receive a message from R1, or at least no sufficient information to act as a proxy. To act, a late acting proxy will first have to obtain the necessary information from elsewhere in the network.

Preferably, the arrangement in a network is such that each restricted node Rx has in its transmission range at least a few early action capable proxies. However, in such an arrangement there preferably needs to be mechanisms to prevent that every action capable proxy would decide to act in all cases when it receives a message from an Rx in its range. If this were not prevented, the presence of multiple capable proxies may cause an increase in message delivery latency or even a decrease in delivery reliability. One of such envisaged prevention mechanisms that, if a certain proxy Px acts on a received message from Rx, and delivers it, there are means for other proxies in range of Rx to know about Px having acted. If they know, they can refrain from acting themselves. Such an information mechanism can take the following form. Suppose that a proxy P1 has received a message $M_i$ from R1, and now has to decide if to act or not. It will then start a timeout counter and listen to the network channel. If it sees a packet from another proxy, say P2, containing a payload that indicates that P2 acted on the same message $M_i$ of R1, then P1 decides not to act and stops the counter. If the counter runs to zero without receiving a packet from other proxy for message $M_i$ of R1, P1 acts. Because of differences in network sending ranges and some inherent unreliability of wireless packet delivery, mechanisms like this will not inhibit in all cases that multiple proxies decide to act on the same message from R1. Therefore, it is envisaged that there are also mechanisms, e.g. in the target nodes, to filter out duplicate messages from multiple proxies that all acted.

In the upcoming ZigBee Green Power standard, the following mechanisms are used for active and valid Proxy Table entries (see ZigBee Green Power specification, 09-5499-18, section A.3.5.2.1, page 120, line 6—page 121, line 17). In case of unicast forwarding, the proxies having proxy table entry for a particular restricted device Rx, calculate the forwarding delay, based on a criteria like: quality of the received signal from the restricted device, availability of unicast routes to the target devices, and the fact of being the first to forward in the past. On expiration of forwarding delay, a proxy sends a ZGP Tunneling Stop message in 2-hop broadcast, with alias network source address and alias network sequence number, both derived from the information in the GPDF, to inform other proxies it will forward the message, and subsequently the ZGP Notification(s) messages in unicast. On reception of the ZGP Tunneling Stop message for the same ZGPD command within the forwarding delay, a proxy cancels its own scheduled transmission. In case of groupcast communication for GPDF indicating reception opportunity, the proxies having proxy table entry for a particular restricted device Rx, calculate the forwarding delay as described above. On expiration of forwarding delay, a proxy sends a ZGP Notification message(s) in APS multicast, and it includes its short address and the indicator of quality of the signal received from the restricted device Rx. On reception of the ZGP Notification message for the same ZGPD command within the forwarding delay, if the ZGP Notification has better quality indicator or equal quality indicator and lower short address, a proxy cancels its own scheduled transmission. In case of groupcast communication for GPDF not indicating reception opportunity, the proxies having proxy table entry for a particular restricted device Rx, forward the ZGP Notification message(s) in APS multicast, with alias network source address and alias network sequence number, both derived from the information in the GPDF, which makes the independently-generated ZGP Notification packets look identical to the Broadcast Transaction Table of ZigBee. The same mechanism is used by sinks capable of sink table based groupcast forwarding (see ZigBee Green Power specification, 09-5499-18, section A.3.5.2.4, page 128, line 25-29).

If the proxy succeeds in transmitting the ZGP Notification, it sets the FirstToForward flag of its Proxy Table to TRUE; it clears it upon reception of ZGP Notification Response from a unicast sink with FirstToForward flag set to FALSE (see ZigBee Green Power specification, 09-5499-18, section A.3.5.2.1, page 121, line 12-17). The sinks filter the received ZGPD commands based on the ZGPD identifier (SrcID) and the frame counter value (see ZigBee Green Power specification, 09-5499-18, section A.3.6.1.2, page 132, line 2—page 134, line 4).

The proxy table entries need to be initially created. They can be for example be created as part of the commissioning process, involving a user and/or a tool. Proxy table entries could also be created automatically. A late action capable proxy that decides to act for a restricted node Rx will, at the end of the action, end up with sufficient information to create a proxy table for Rx in itself, and it is beneficial if it does so. A late action capable node that overhears communications allowing it to make an extra proxy table entry may decide to do, especially when it has free space for more entries available. Imagine a proxy Px that (over)hears information about a restricted node Rx being sent around in the network that allows it to add Rx to its proxy table and become an early action capable node for Rx; especially in the case that Px did not receive a message from Rx (yet), i.e. it may not (yet) be in Rx's range. Px might for example hear a broadcast- or multicast-type message, intended for all interested nodes, informing them about the node Rx. How should the proxy Px decide whether it should add Rx to its proxy table, if this means it has to delete another node from the table? Assistance methods for such a decision are also disclosed below.

In the upcoming ZigBee Green Power standard, the following mechanisms are used for configuring information into Proxy Tables (see ZigBee Green Power specification, 09-5499-18, section A.3.5.2.1, page 118, line 32-39; section A.3.9, page 165 line 2). As part of successful commissioning procedure, the ZGPS or the ZGPCT sends the ZGP Pairing message with AddSink flag set to Obi, typically as a network wide broadcast, carrying i.a. the SrcID, security settings and the required communication mode. On reception of ZGP Pairing, the proxies create/extend the Proxy Table entries with the supplied information. For sinks capable of sink-table-based forwarding, Sink Table entries are created upon reception of Configure Pairing command, which can be sent by another ZGPS or ZGPCT (see ZigBee Green Power specification, 09-5499-18, section A.3.5.2.4, page 127, line 35—page 128, line 1).

However, due to device portability and propagation changes, as well as devices being added later to the network, the new proxies may need "state information" on a restricted device at a later point in time as well.

Suppose that a late action capable proxy receives a message from R1, and then gets no information at all, via an information mechanism like described above, indicating that another proxy has already acted. In that case, the proxy has a difficult decision to make. If it decides to refrain from acting, the message may remain undelivered. However if it decides to act, it will mean communicating with the network in order to obtain the necessary information on how to act. Such communication will typically have to take the form of a broadcast- or multicast-type query request ('who can tell me what to do with messages from R1'), since having some dedicated information nodes potentially puts high resource (esp. memory) requirements on them, and requires their location to be known to/discoverable by the proxies, it may also introduce a single point of failure. Such broadcast or multicast requests may consume significant bandwidth. Significantly, there may be a penalty to reliability: under adverse conditions (especially in a large and busy network), the broadcast/multicast request traffic might drown out messages from other devices, in particular other restricted nodes, causing them to remain undelivered. However, if broadcast/multicast traffic is limited by the network, then Px may fail to obtain the necessary information needed to act without exceeding an envisaged deadline for the delivery of the message from R1 to T1. There is even a possibility that Px will not be able to obtain the needed information at all.

It is therefore beneficial if a late acting capable node can be assisted in some way in its decision whether or not to act, with this assistance going beyond the information mechanisms described above. Such assistance methods are disclosed below.

In the upcoming ZigBee Green Power standard, the following mechanisms are used for maintaining information in the Proxy Tables.

On direct reception of a GPDF from ZGPD Rx, the proxy Px sets the InRange flag of the Proxy Table entry for Rx to TRUE (see ZigBee Green Power specification, 09-5499-18, section A.3.5.2.1, page 119, line 44—page 120, line 5). On reception of ZGP Notification or ZGP Tunneling Stop command for which Px didn't see the triggering GPDF, Px sets the FirstToForward flag to FALSE (see ZigBee Green Power specification, 09-5499-18, section A.3.5.2.2.2, page 124, line 25-28). If Px receives ZGP Response command carrying an address of another device in the Proxy field, Px sets the FirstToForward flag to FALSE and removes the GPDF queued for delivery to this ZGPD, if any (see ZigBee Green Power specification, 09-5499-18, section A.3.5.2.1, page 118, line 43—page 119, line 6). It is recommended for proxies operating in the building automation scope to clear the InRange flag when missing ten consecutive GPDF from Rx (see ZigBee Green Power best practices for ZBA, 11-0196-01, section 5.3.2.1, page 24, line 21-24).

The following mechanisms are part of the Proxy Table Maintenance feature (see ZigBee Green Power specification, 09-5499-18, section A.3.5.2.2, page 124, line 2-6; section A.3.5.2.2.3, section A.3.5.2.2.4, section A.3.5.2.1, page 118, line 27-30). If a proxy Px receives GPDF from unknown ZGPD Rx, the proxy starts the discovery delay timer. Px then listens for ZGP Notification/ZGP Tunneling Stop messages forwarded by other proxies on behalf of the same ZGPD, to derive necessary information. Both messages carry i.a. flags indicating the used forwarding modes. On discovery delay timer expiration, if no messages were received, or there is still information missing (e.g. the addresses of the unicast sinks or pre-commissioned groups), Px sends a broadcast ZGP Pairing Search command, requesting the sinks paired with ZGPD in the indicated communication mode(s) to respond with ZGP Pairing. On ZGP Pairing reception, the Proxy Table is updated. If ZGP Pairing Search or ZGP Pairing commands for Rx are received within discovery delay, Px cancels its own ZGP Pairing Search transmission. Inactive Proxy Table entries can be removed and the SrcID stored in the Blocked SrcID list instead.

In the current ZGP specification, no corresponding mechanisms are specified for Sink Table maintenance in sinks capable of sink-table-based forwarding.

Old/superfluous proxy table entries should be removed, preferably automatically. However, the restricted devices may have very irregular transmit patterns, dependent i.a. on the availability of energy and/or the user trigger.

One way to manage proxy tables would be to use 'least recently used' replacement strategies. Under the 'least recently used' strategy, if a proxy Px needs to add a Rx node to its table, which is already full, it will drop the node $R_i$ that it least recently used, for example a) $R_i$ is selected as being the node, among all nodes in the table, on behalf of which Px acted as a proxy least recently (furthest in the past)

b) $R_i$ is selected as being the node, among all nodes in the table, that Px observed least recently as emitting any message There are problems with such 'least recently used' replacement strategies. Suppose that proxy tables are limited to 5 entries, and a network contains 15 proxies and 15 restricted nodes, with all of these within receiving range of all others. Suppose that 10 of the restricted nodes are temperature sensors that report data every minute, and 5 are light switch buttons that are used on average once per day. In this case, there is a high probability that, every morning, no matter what the exact 'least recently used' replacement strategy, all proxy tables in all proxies will have filled up with data about the temperature sensors, with all light switches having disappeared from the tables. Depending on the design of other aspects of the network, this will make the light switch message processing slow, unreliable, or even impossible. So a better strategy than 'least recently used' is needed. The 15 proxies have 15*5=75 table entries among them, so it should be possible have every one of the 15 restricted nodes present in the table of at least one proxy.

Another way to manage proxy tables would be to use 'first in first out' replacement strategies. That's obviously suboptimal also, since it does not take into account the node activity or importance.

A fallback embodiment is to involve the user in the removal of the proxy table entries.

The upcoming ZigBee Green Power standard offers the following mechanisms for Proxy Table entry removal.

The removal of ZGPD device from the network, incl. removal of the related Proxy Table entries, can be triggered by the ZGPD sending the ZGPD Decommissioning command and/or by the sink/commissioning tool sending the ZGP Pairing command with RemoveZGPD flag set to TRUE (see ZigBee Green Power specification, 09-5499-18, section A.3.5.2.5, page 129, line 10-15). Both actions are expected to be triggered by the user. The removal of a particular pairing from the Proxy Table can be triggered by sink/commissioning tool sending the ZGP Pairing command with AddSink flag set to FALSE. Sinks remove stale unicast pairings by sending ZGP Notification Response with NoPairing flag set to TRUE, (see Zig-Bee Green Power specification, 09-5499-18, section A.3.5.2.5, page 130, line 32—page 131, line 2) It is recommended for proxies operating in the building automation scope to clear the Proxy Table entries with the InRange flag set to FALSE (see ZigBee Green Power best practices for ZBA, 11-0196-01, section 5.3.2.1, page 24, line 18-20).

While the table entries for unknown devices may be discovered "just in time", e.g. when first observing the device, and once removed/invalidated table entries can be re-discovered/activated again, care must be taken that bad heuristics do not lead to grave failure of the system. Imagine a portable emergency button, intended to be operated when the bearer requires assistance. Having it realized as a resource restricted device, esp. energy-harvesting device, may be beneficial, as this guarantees that one does not have to deal with empty batteries/battery replacement. A pairing with a target will be created. But the button will be operated very rarely (say a couple of times a year), possibly each time in a different location (as its bearer moves); and even the maintenance operations, if any, will be infrequent (e.g. every two weeks). If, upon button activation, no proxy has the table entry, in one envisaged system implementation the message will not be forwarded, and the query may be send instead; and the query result may only be used for forwarding the next message. However, the current critical alarm may not get forwarded.

This invention comprises several techniques to manage the contents of proxy tables, in ways that optimize performance, latency, and reliability for the types of networks described above, while preventing the proxy table overflow. We disclose techniques that prevent unnecessary growth of proxy tables:
1. Proxy table entries classes, incl.
    a. Wildcard techniques that allows proxy table information to be stored more compactly;
    b. Table entry classes with different maintenance policies, including table entries not to be created
    c. Decision criteria to determine the table entry class, e.g. a proxy to decide that for a certain restricted node, it can omit that action of acting as a proxy and/or adding an entry to the table We also disclose techniques for optimizing proxy table cleaning. Cleaning a table means removing the information for one or more restricted nodes. Cleaning can be done at anytime, to create free space for expected future use, or just-in-time, to create free space at the moment that a proxy has decided that a new table entry must certainly be added. Instead of being immediately removed, the entries can be marked as "removable", so that the status information on the restricted device is kept until it needs to be replaced with an entry for a different restricted device; that allows to avoid re-discovery in case the status information becomes relevant again. To optimize table cleaning means to use selection criteria, in choosing the entries to be deleted, that optimize some aspect of future network performance (reliability, latency, use of bandwidth, etc). These fall into two categories
2. Identification of stale entries that can be deleted without ever causing a loss of performance
3. Means to determine which remaining entries are more desirable to keep than others
    a. Means that depend on the use of status information sent around the network This invention further discloses methods that assist late action capable proxies in making decisions whether to act.
Detailed Description Of The Invention
(4'/5')

One embodiment for preventing unnecessary growth of the proxy tables is to limit the number of dedicated proxy table entries that a proxy needs to store.

In one embodiment of this method, the proxies are provided a "wildcard" entry, allowing it to handle the restricted devices for which there is no dedicated proxy table entry. When looking up a restricted device Rx in a proxy table containing a "wildcard" entry, if the Rx does not match any normal entry, it may still match the "wildcard" entry. A "wildcard" entry may specify that it matches all devices not otherwise matched, or only a subset defined in a certain way, e.g. those devices Rx that have a globally unique device identifier ending in the two bits '01'. Such a "wildcard" entry shall indicate the intended target, which can be a (list of) broadcast, groupcast/multicast, or a unicast address(es). If unicast or groupcast/multicast, the address preferably indicates a/some device(s) capable of handling multiple restricted devices and respective sinks; e.g. a building management system, able to process the packets, identify the involved devices and route the message accordingly, if required. The target address in the "wildcard" table entry can also be an invalid address, indicating the proxy shall not forward on behalf of restricted devices it does not have the entry on. In the simplest implementation, the proxy forwards the packet of the restricted device unprocessed. In another implementation, the table entry can contain information allowing for some filtering and making the forwarding conditional. E.g. it can including device type, device capabilities, message or protocol type. Further, the table entry can contain some security information, including expected security level, expected key type, expected key value, such that the proxy can perform authentication/encryption validation; and the proxy may forward restricted device's message. There may be multiple wildcard entries covering different characteristics of device. The wildcard entries may be created in all or in carefully selected proxies, e.g. in order to minimize the amount of communication to the wildcard traffic handling device; this can be further supported by careful choice of dedicated entries and wildcard filtering criteria. The wildcard entry may be created at commissioning time, may be available out-of-the-box, or may be created upon a resolution attempt triggered by reception of the first packet from an unknown restricted device. Wildcard entries can also be used if all information required for forwarding is derivable from the received restricted devices message. The wildcard entry may also specify what shall happen if the filtering/processing, if any, fails; the proxy may be instructed to forward unprocessed, provide additional information, or drop the frame. Wildcard table entries may also be used if the processing according to the data in the dedicated table entry returns an error, e.g. security error. Then, the restricted device's message may be forwarded unprocessed to the wildcard traffic handler, in addition to/or instead of sending the broadcast-/multicast-type query for the restricted device.

When wildcard entries are used, one can consider disabling auto-discovery of table entries completely.

In another embodiment of this method, the information about the restricted node can be provided to the proxy, with the instruction not to create a dedicated proxy table entry for it. Still, this information can be beneficiary used by the proxy. For example, when a proxy hears a message from an unknown restricted device and sends out a query, the target/tool may respond with the proxy table information with the information not to create the proxy table entry; the proxy can thus forward the original trigger frame, but will not create an entry. The proxy may therefore be required to buffer the restricted device's message for some time, such that it can still forward the message upon reception of response to its query; esp. in the case when no other proxy is observed forwarding this message. In extension, the exact table lifetime may be specified, e.g. in terms of time or number of packets.

Both embodiments above can be combined beneficially, with a proxy having some dedicated entries, some wildcard entries for selected classes of devices, and the discovery for the remaining restricted devices.

In yet another embodiment of this method, the proxy table entry stores the information about different entry classes, e.g. how the table entry was created. It may allow for differentiating between auto-discovered entries and explicitly created entries, or even further differentiating between out-of-the-box entries, tool-created entries, dedicated entries (e.g. by unicast messages in commissioning or operational mode) and redundant entries (e.g. by broadcast/multicast messages in commissioning of operational mode). The entry class may be encoded explicitly, e.g. with some flags or an enumeration field; they may also be derived, e.g. from entry position in the list or availability or lack of certain information (for example, for auto-discovered entries, the restricted device type may not be available). The entry class may indicate the creation method, or explicitly the intended entry maintenance behavior (e.g. permanent entry flag, removable entry flag). The different entry classes may have different creation and removal strategies, e.g. a proxy may respond to a tool's attempt with "entry full" status and let the tool resolve it, or e.g. a tool-created entry may only be removed by a tool, and the auto-discovered entries may be the first candidates to replace.

Preferably, the decision as to which restricted devices need dedicated proxy table entries is based on the characteristics of the restricted devices. One criterion may be the reporting frequency. The restricted devices which communicate very frequently preferably have dedicated entries, to prevent frequent discovery/the detour wildcard traffic. One other criterion may be the delay requirements of the restricted device. The restricted devices which message require quick handling preferably have dedicated entries, to avoid the (unpredictable) delay caused by the discovery or wildcard handling. A typical example is user-controlled lighting. The user expects the light command to become effective (or other perceivable feedback to be provided) not later than 200 ms after the user action. One other criterion may be the reliability requirement. One other criteria may be restricted device's capabilities, e.g. its ability to also receive. E.g. if the restricted device is not capable of reception, there may be no need to single out a specific proxy for packet delivery, not for the proxy to keep track of the FirstToForward or InRange condition, so a dedicated entry may not be needed. One other criterion may be the restricted devices mobility patterns; if it roams about too quickly, there may be no point in creating and removing dedicated proxy table entries. One other criteria may be the number of paired targets; it may be better to rediscover a single unicast target than multiple groups of targets. Various of the above criteria can be beneficially combined.

The decision may be made per device; this may require the restricted device to expose this information, e.g. as part of device documentation, in the commissioning process, as a readable attribute or as part of its packet. The default behavior for the proxy will need to be specified in case this information is not readily available initially. Some of the restricted device characteristics may be derived by observing the restricted device's behavior for some time. Alternatively there may be generic rules, e.g. based on restricted device type/application. For example, all light switches may need dedicated entries, while they may never be created for temperature sensors.

The decision for which restricted devices to create dedicated table entries may be made by the proxy, at commissioning time or in operation. The decision may also be made by the sink/tool.

For implementation in the ZigBee Green Power specification, the "wildcard" Proxy Table entry can be identified by means including ZGPD SrcID field set to reserved/invalid/unspecified value (e.g. 0xffffffff) and/or the defining one of the now reserved sub-fields of the Options field as a "Wildcard" flag. Any other field of the Proxy Table entry can be set to a specific value to be used for checking and filtering, or a reserved/invalid/unspecified value, indicating that this information is ignored upon reception.

Specifically, The Unicast ZGPS, Derived Group ZGPS and Commissioned Group ZGPS sub-fields of the Options field, if set, indicate availability of a certain type of address, to which ZGP Notification shall be sent. In case of unicast, omitting the ZGP Tunneling Stop and the forwarding delay may be considered. With AssignedAlias sub-field set to TRUE, AssignedAlias field may be provided to be used for forwarding the ZGP Notification (and ZGP Tunneling Stop and/or ZGP Commissioning Notification) command. There may be means to indicate use of derived alias or no alias at all, e.g. by utilizing AssignedAlias sub-field set to FALSE, another flag, or a different reserved value of the ZGPD SrcID. SecurityUse sub-field, if set to FALSE, may indicate that no security check is to be performed. SecurityUse sub-field, if set to TRUE, may indicate the request to perform the security processing, in the scope as specified by the sub-fields of the Security Option field and the remaining security-related fields. The security level, if set to value other than 0b00, may indicate the minimum or the required security level. The key type, if set to value other than 0b000, may indicate the required key type to use, the key field may be present. The ZGPD security frame counter may be used to indicate the lowest acceptable value for all wildcard ZGPD (and e.g. be updated periodically in the proxies); its usage may be indicated by a value other than 0xffffffff or 0x00000000 and/or by setting the Sequence number capabilities sub-field of the Options field to TRUE.

The above applies equally to the Sink Table entries of the sinks capable of sink table based forwarding feature. Care must be taken, that the ZGPD Command Translation Table entries, if default or configured, have a matching logic, i.e. that wildcard entries are not confused with default or specific entries.

To instruct the proxy to use the ZGPD information, but not create a Proxy Table entry, the sink/tool may preferably set the DeviceID field of the ZGP Pairing command to an invalid/reserved value, e.g. 0xff; the last reserved sub-field of the Options field of the ZGP Pairing command can be defined to request/forbid Proxy Table entry creation for this ZGPD; the Options field may also get extended to 16-bit value, to allow for further future modifications. The same applies to Sink Table creation in sinks capable of sink table based forwarding; the changes have then to be applied to the ZGP Configure Pairing command.

In a further embodiment, the wildcard entry can be used for the ZGPD commissioning operation, and store the pre-configured/fallback/default OOB ZGPD security key or pre-configured/fallback/default ZGPD TC-LK the ZGPD may initially use or may resort to, e.g. upon reset and loosing configuration data. If combined with broadcast sink address, this supports standard ZGP proxy-based commissioning procedure, but secured, potentially without the need of exchanging the keys in the clear. If combined with unicast/groupcast address(es) in the Proxy Table and/or Sink Table, carrying the address of the centralized maintenance device(s), like e.g. ZigBee Trust Centre, ZigBee Coordinator, ZigBee Network Manager or other type of controller/manager node, it may allow for use of Access Control Lists and/or use of Installation Codes, as discussed in ZigBee Smart Energy 1.0 specification or ZigBee Home Automation 1.2 specification. The same applies to temporary entries or non-created entries.

To indicate the class of entry, the Proxy Table may utilize the now reserved (in ZGP) sub-fields of the Options field. A sub-field PermanentEntry/CTentry can be added, to indicate entries which should not be removed by automated maintenance procedures. In addition/alternatively, a sub-field AutoDiscoveredEntry may be added, to indicate the entry was created automatically and may be removed by automated maintenance procedures.

In some embodiments, for example an IP/6lowpan based networks, it might not be necessary for proxies to be initialized with wildcard table entries: such entries might be present in every proxy by default before any configuration tool or system is applied. In a 6lowpan network, a default entry might indicate the address of the border router, or another well-defined network address inside the 6lowpan subnet.

(1'/2'/3'/6')

One solution for a proxy to clean its table is as follows is to take into account the reliability indication, based at least partly on the number of packets from the restricted device that the proxy missed to directly receive.

In one embodiment, each proxy Px calculates the reliability indication for each restricted device Rx in its table, as the difference between the current packet counter and the packet counter of the last packet from the restricted device Px has observed directly. The bigger the difference, the more desirable it is to remove the entry.

In another embodiment, each proxy Px calculates a service ratio for each restricted device Rx in its table, as the ratio Ratio (Rx)=RL/RR, with RL the number of times that Px acted as the proxy for Rx since time T, and RL the number of times that Rx sent a message in a time period Tsince T. This requires the proxies to keep the counter RL of the messages handled. In a variant of this embodiment, a combination of least-recently-used and ratio data is used to determine which devices to remove. If it is not necessary to calculate the exact ratio, various ways to approximate the ratio can be used.

The value RR can be equal to or derived from the sequence number/frame counter from the restricted device's packet, if the restricted device is capable of maintaining monotonous values. Alternatively, if the restricted device is not capable of maintaining monotonous values, the invention requests one or more devices to maintain a 'virtual' message count for Rx, that is increased whenever the system receives a message from Rx. In a preferred embodiment, the packet count is maintained in at least one of the paired target(s), since the target should receive the restricted device messages forwarded by all capable proxies.

The algorithms to calculate the service ratio can be implemented as follows.

---

Algorithm A (running in a proxy to compute the ratio for that proxy)

---

Px Initalisation (at the time of creating proxy table entry)
    LAST_SEQx :='as provided at the time of proxy table entry creation (else: none)'
    COUNTx:=0; //If the proxy table entry was created as a result of the direct interaction with the restricted device, the packets of the restricted device may be already counter
When (Px directly receives the message Mi from the restricted device Rx with SEQi)
    If (restricted device implements incremental sequence number AND LAST_SEQx=none)
        LAST_SEQx := SEQi;
    COUNTx:=COUNTx+1;
When (Px receives a status message containing a SEQi value)
    Px computes Ratio(Rx) := COUNTx / (received SEQi − LAST_SEQx)
    LAST_SEQx := received SEQi;
    COUNTx:=0;

---

Algorithm A1

---

In a variant of this algorithm, we initialize a variable Ratio(Rx) to zero initially and use
    ○ Compute Ratio(Rx) := Ratio(Rx) / 2 + (COUNTx / (received SEQx − LAST_SECx))/2

---

It has the advantage of computing a longer historical 'memory' for the ratio.

---

Algorithm B (running in a proxy to compute the ratio for that proxy):

---

Px Initalisation:
    FIRST_STATUS_SEQx='as provided at the time of proxy table entry creation (else: none)';
    COUNTx:=0;
When (Px directly receives the message Mi from the restricted device Rx with SEQi)
    If (restricted device implements incremental sequence number AND FIRST_SEQx=none)
        FIRST_SEQx = SEQi;
    COUNTx:=COUNTx+1;
When (Px receives a status message containing a SEQi value)
    Ratio(Rx) := COUNTx / (SEQi − FIRST_STATUS_SEQx);
    if (FIRST_STATUS_SEQx=='none')
        FIRST_STATUS_SEQx = SEQi;

---

Algorithm C:

---

Px Initalisation:
    LAST_SEQx='as provided at the time of proxy table entry creation (else: none)';
When (Px directly receives the message Mi from the restricted device Rx with SEQi value OR
When it receives a status message containing a SEQi value)
    MISS = LAST_SEQx − SEQi;
    LAST_SEQx = SEQi;

For proxy devices that are within the range of R1, like P1 and P2, it is easy to calculate (a good approximation of) Ratio (R1) by just listening for messages from R1, and keeping count of the messages directly received to approximate the right hand side of the ratio formula RR. The RL is easy to keep track of for any proxy no matter where it is located with respect to R1.

For proxy devices out of range of R1, like R3, or devices somewhere at the edge of the range, or devices with very unreliable link to R1, it is not possible or easy/reliable to known the current packet counter value/the RR.

We therefore propose the following novel and inventive measure At least one device in the network that has knowledge of the current packet counter/RR of Rx transmits a status message that enables receiving proxies to determine their Ratio (Rx), or make other calculations related to their proxy table cleaning.

As one aspect of this method, the status message is a message dedicated to Proxy Table maintenance, which can be sent by at least the paired target(s). It can be sent periodically, or upon certain event. Further, the message transmission may be dependent on other criteria, including the network change dynamics (incl. mobility of restricted nodes, the sink and/or the proxy(s)), number of restricted devices paired with the sink, overall traffic load on the network/of the sink/proxy(s). The criteria may further include the communication frequency of the restricted device, its application and/or the number of messages received since the last update; there may be no point in sending the time-triggered update if the restricted device didn't send a minimum number of packet since, wherein the minimum preferably corresponds to the proxy threshold criteria. Sending can be performed by one or all paired targets, independently or in cooperation; sending can be dropped/postponed if announcement from a different target is received.

It can be sent in broadcast, in multicast, with limited hop count range, if known to the target, or in unicast to selected proxies, if known to the target. A target here may be the device executing the messages of the restricted device (e.g. a lamp reacting to the commands of a restricted light switch or occupancy sensor). A target may also be a device processing the messages of the restricted device, e.g. a cache (e.g. for storing them for trend analysis, data mining or querying), a tool a network central device, or a bridge/gateway/border type of device, forwarding the data into another system. Beneficially, this status message is very similar, or identical, to the message used by the network system to initialize (or commission) the proxy tables. Thus, the amount of software code needed in the network nodes would be reduced, allowing these nodes to be made at a lower cost.

In another aspect of this method, the sending of the status message dedicated to Proxy Table maintenance can be requested. It can be e.g. requested by a proxy requesting proxy table information, allowing this and other proxies to update their proxy tables accordingly. It can be requested based on timer, e.g. entry lifetime timer (i.e. time since creation/last validation of the entry), or activity timer (i.e. time since last usage of the entry).

For the implementation in the ZigBee Green Power standard, we propose to use the already defined ZGP Pairing message which already includes the Security Frame Counter field can be used as a status message with SEQx, to benefit from the code re-use. The sending of the ZGP Pairing message may be triggered by the ZGPS periodically, or upon an event, e.g. upon reception of ZGP Pairing Search command or broadcast ZGP Notification command, indicating a proxy with (potentially) outdated Proxy Table entries.

To enable calculation of reliability indicator for a Proxy Table entry for a ZGPDs not capable of security and not capable of sending incremental MAC sequence number (as indicated by the SecurityLevel=0b00 and MACcapabilities=0b0), the ZGPS are requested to increment the Security Frame Counter parameter of their Sink Table entries, and to include provide this value in the ZGP Pairing commands. Analogously, the proxies are to treat such Security Frame Counter (when SecurityLevel=0b00 and MACcapabilities=0b0) as a means for proxy table maintenance, and not as a freshness indicator, i.e. they shall not compare the MAC sequence number value of the received GPDF with the value stored in the Proxy Table.

Upon reception of a ZGP Pairing message, the proxy shall calculate the reliability indicator for this Rx. It may remove the Proxy Table entry if the reliability indicator falls below a threshold. For the ZGPS capable of sink table based forwarding, the ZGP Configure Pairing message is used for that purpose.

For IP-based implementation, e.g. in a 6LoWPAN-based IP network containing restricted devices, either ZGPDs and/or native IP restricted devices, and IP-capable proxies, IP based messages for forwarding the restricted device's messages can be devices. Specifically, CoAP unicast or multicast messages can be used for carrying the information defined above in the CoAP payload.

In a further aspect of this method, at least one proxy can share the packet counter value in a status message; the message format may be the same or different that for the previous two aspects. It is preferably done as a local broadcast or groupcast/multicast. It can be done periodically or upon an event; by one selected proxy, proxies fulfilling certain reliability ratio criteria, or all proxies within a given range/segment with a Proxy Table entry for Rx. As part of it, the proxy(s) may exchange their own reliability indicator, to establish relative rather than absolute Proxy Table removal criterion; e.g. proxy will only remove its table entry if there are N proxies with better reliability. This will assure, that even for very bad communication environments, which all proxies missing substantial number of packets from the restricted devices, some proxies still remain active.

For the implementation in the ZigBee Green Power standard, we propose for the proxies to exchange Proxy Table entries; thus benefitting from code re-use. They may exchange the complete table content, or preferably only selected entries. They may exchange the entries periodically, or preferably on an event (e.g. one proxy calculating low/falling reliability indicator). The exchange of tables is preferably triggered by a 2-hop broadcast/groupcast, without alias, in the ZCL Read Attributes command. The proxy(s), incl. the triggering proxy, respond in the same manner (broadcast/groupcast), with ZCL Read Attributes Response, with its Proxy Table entry(s) for the included/all ZGPD. Alternatively, The proxies may report their own tables in ZCL Attributes Report, as a single/two-hop broadcast/groupcast. Sinks capable of sink table based forwarding feature exchange their Sink Table entries in the same manner.

Alternatively, a new table maintenance command can be defined, where the amount of data is reduced to only the relevant data, to reduce the medium usage. E.g. the command could include the SrcID, the (virtual) security frame counter, and the reliability indicator. It may further include some options flags, e.g. indicating which table entries shall be reported (only the included SrcID, all table entries, all table entries with unclear status). It may also allow exchange of reliability data between sinks and proxies.

Upon reception of a ZGP Pairing message, the proxy shall calculate the reliability indicator for this Rx. It may remove the Proxy Table entry if its own reliability indicator falls below a threshold. The threshold may be implementation-specific, defined in the ZGP standard or profile-specific best practices, or a configurable parameter. If the reliability indicator of other devices is included, it can be taken into account before deciding on removal of a particular table entry.

For IP-based implementation, e.g. in a 6LoWPAN-based IP network containing restricted devices, either ZGPDs and/or native IP restricted devices, and IP-capable proxies, we propose that proxies also may exchange table entries, whereby the format of the entries will be different in an IP based implementation. These table entries can contain cached records for the restricted devices, that were previously requested, e.g. from the DNS by a proxy acting as a DNS client, or using equivalent discovery mechanisms (e.g. RD). The exchange of tables can be triggered by a single-hop or 2-hop IP multicast e.g. a CoAP multicast POST request with payload. Proxy(s) respond in the same manner using IP multicast, e.g. a CoAP multicast response to the POST or a separate (new) CoAP POST request. Alternatively, a new table maintenance command can be defined, preferably carrying only the reliability-relevant information, which is sent by IP multicast in one of the just described ways. Reliability calculations can be done similar as for the ZigBee Green Power case.

In yet another aspect of this method the status message is a regular communication packet in the network that still allows to obtain the value of the current packet counter/RL, e.g. the packet forwarded by other proxies on behalf of the same restricted device. This has the added benefit of not requiring dedicated communication.

For the implementation in the ZigBee Green Power standard, we propose for the proxies to utilize the ZGP Tunneling Stop and ZGP Notification commands they already receive for reliability and proxy table maintenance purposes (e.g. setting InRange and FirstToForward) also for proxy table entries removal. When a proxy receives ZGP Notification with (virtual) security frame counter, it shall calculate the reliability indicator, and—if it falls below a threshold—it shall consider removing the entry (rather than/in addition to setting the FirstToForward/InRange flags).

In addition, we propose the proxy to compare the value of the Distance field received in ZGP Notification sent by other forwarding proxies. For that, the proxy may need to locally store its own Distance value for the ZGPD, e.g. for the last received frame, or preferably averaged over a period of time. If the proxy sees a number of other proxies with a better Distance value, esp. if its own reliability indicator is low, the proxy may decide to remove the proxy table entry instead of/in addition to refraining from forwarding (if the GPDF was also received directly) and setting FirstToForward to FALSE. To facilitate it also in case of the unicast forwarding, the ZGP Tunneling Stop command is recommended to be extended with the Distance field.

Both ZGP Notification and ZGP Tunneling Stop may also be extended with the reliability indicator field.

To allow the proxy to determine the FirstToForward proxy's identity also in the unicast case, the ZGP Tunneling Stop may be sent without the alias. Alternatively, the proxies may be able to determine the original sender of ZGP Tunneling Stop/ZGP Notification/ZGP Commissioning Notification from the MAC source address, if the NWK header hop count field has its initial value (e.g. 2 for the ZGP Tunneling Stop).

The same can be applied to Sinks capable of sink table based forwarding. Further, if a proxy Px directly receives a GPDF from an unknown ZGPD SrcID and if it receives ZGP Tunneling Stop and/or ZGP Notification commands from one or more other proxies, especially if they have good/better reliability indicators and/or value of the Distance field, Px may refrain from sending the ZGP Pairing Search command and from creating the Proxy Table entry.

The different methods above can be also advantageously combined. For all the methods above, the threshold for table removal may be implementation-specific, defined in the ZGP standard or profile-specific best practices, or a configurable parameter.

For all the methods above, the proxy may, while removing the Proxy Table entry, store the ZGPD SrcID in another list, to prevent subsequent rediscovery. It may be the zgppBlockedSrcIDs attribute. It may also preferably be a separate attribute, storing ZGPDs which are part of the network, but for which this proxy shall not forward.

For IP-based implementation, e.g. in a 6LoWPAN-based IP network containing restricted devices, either ZGPDs and/or native IP restricted devices, and IP-capable proxies, the restricted device's messages can be forwarded e.g. as IPv6 multicast CoAP POST request, with limited TTL/hop count, if intended only for communication between the proxies, or e.g. as IPv6 unicast CoAP GET response with Observe option. These, when received by other proxies, can be used for proxy table entries removal as described above.

Preferably, the status messages, if dedicated, are exchanged at the time least affecting normal system operation. E.g. for office buildings, the updates can be scheduled in non-office hours/days.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A method for managing a proxy table at a proxy node, the method comprising:
   the proxy node receiving a message from a given resource restricted device of a plurality of resource restricted devices, the message being intended to at least one corresponding destination device,
   the proxy node forwarding the message to the destination device based on a proxy table which includes a set of proxy table entries of the proxy table, the set of entries of the proxy table indicating a set of resource restricted devices for which the proxy node does forward messages to one or more corresponding destination devices, and wherein at least one proxy table entry of the set of entries contains an indication of an entry class,
   wherein the entry class indicates at least one of a creation method that led to creation of the at least one proxy table entry, or entry maintenance behavior that the proxy node, or another device managing proxy table entries in the proxy node, applies to the at least one proxy table entry, or at least one characteristic of the given resource restricted device,
   the proxy node managing the set of entries of based on the entry class, wherein the position of the at least one proxy table entry is the indication of the entry class.

2. The method of claim 1, wherein the proxy node employs a creation and removal strategy corresponding to the entry class to manage the set of entries.

3. A method for managing a proxy table at a proxy node, the method comprising:
   the proxy node receiving a message from a resource restricted device, said message being intended to at least one corresponding destination device,
   the proxy node checking whether an entry for the resource restricted device is included in a set of entries of the proxy table, the set of entries of the proxy table indicating a set of resource restricted devices for which the proxy node does forward messages to the corresponding destination device,
   depending on the result of the checking, the proxy node checking for a wildcard entry, corresponding to a set of restricted devices, wherein the wildcard entry excludes restricted devices denoted in other entries of the proxy table,
   the proxy node forwarding the message depending on the result of the proxy node checking for the wildcard entry.

4. A method for managing a proxy table at a given proxy node, the method comprising:
   the proxy node receiving a given message from a given resource restricted device, said message being intended to at least one corresponding destination device,
   the proxy node checking whether an entry related to the given resource restricted device is included in a set of entries of the proxy table, the set of entries of the proxy table indicating a set of resource restricted devices for which the proxy node does forward messages to the corresponding destination device,
   the proxy node forwarding the given message depending on the result of the checking,
   the proxy node, for at least an entry related to the given resource restricted device, monitoring a relative usage of the entry related to the given resource restricted device for forwarding messages for the given resource restricted device in relation to a usage of competitor proxy nodes for forwarding messages for the given resource restricted device, and deciding upon keeping, or amending, or removing the entry related to the given resource restricted device.

5. The method of claim 4, wherein the step of monitoring comprises the given proxy node comparing a number of messages from the given resource restricted device forwarded by the given proxy node with a number of messages from the given resource restricted device forwarded by the competitor proxy nodes.

6. The method of claim 5, wherein at the step of forwarding, the given proxy node stores at the entry related to the given resource restricted device of the proxy table a sequence number of the given message, and wherein the step of monitoring comprises
   receiving a message from the destination device indicative of a sequence number of a message last received at the destination device and originated from the given resource restricted device,
   comparing said sequence number of the message last received at the destination device with the sequence number stored in the proxy table,
   cleaning the entry related to the given resource restricted device based on the result of the comparing of said sequence number of the message last received at the destination device.

7. The method of claim 5, wherein the step of forwarding comprises the given proxy node incrementing a counter at the entry related to the given resource restricted device of the proxy table, and wherein the step of monitoring comprises
   receiving a message from the destination device indicative of a total number of messages received at the destination device and originated from the given resource restricted device,
   comparing said total number of messages received at the destination device with the counter in the proxy table, and
   cleaning the entry related to the given resource restricted device based on the result of the comparing of said total number of messages received at the destination device.

8. The method of claim 7, further comprising the given proxy node resuming with the counter in a current state of the counter at the entry related to the given resource restricted node.

9. The method of claim 4, wherein the step of forwarding further comprises the given proxy node storing at the entry related to the given resource restricted device of the proxy table a first indication of quality indicative of a communication link quality between the given resource restricted device and said given proxy node, and wherein the step of monitoring comprises
   receiving a message from at least one competitor proxy node including a second indication of quality indicative of a communication link quality between the given resource restricted device and said at least one competitor proxy node,
   comparing the first indication of quality with the second indication of quality, and
   cleaning the entry related to the given resource restricted device based on the result of the comparing.

10. The method of claim 9, wherein the first and second indications of quality are derived from a received signal strength respectively at the given proxy node and at the at least one competitor proxy node.

11. The method of claim 9, wherein the first and second indications of quality are derived from a number and/or time distribution of messages forwarded by the given proxy on behalf of the given resource restricted device with respect to a number of messages originating from the given resource restricted device.

12. The method of claim 9, wherein the step of cleaning the entry is carried out after the given proxy node has found that the number of competitor proxy nodes having a greater indication of quality than the first indication of quality is at least equal to a threshold.

13. The method of claim 4, wherein the monitoring comprises the given proxy node receiving a message from at least one competitor proxy node and the given proxy node counting the number of competitor proxy nodes, and wherein the given proxy node cleans the proxy table based at least partly on the number of competitor proxy nodes.

14. The method of claim 4, wherein the proxy node cleans the proxy table by:
   removing the entry related to the given resource restricted device from the proxy table; or
   indicating in the proxy table that the entry related to the given resource restricted device is unused; or
   preventing from creating a new entry for the given resource restricted device from the proxy table.

15. A proxy node comprising:
   a receiver for receiving a message from a first resource restricted device, said message being intended to at least one corresponding destination device,
   a memory for storing a proxy table which includes a set of proxy table entries of the proxy table, the set of entries of the proxy table indicating a set of resource restricted devices for which the proxy node does forward messages to the corresponding destination device, and wherein at least one proxy table entry of the set of entries contains an indication of an entry class,
   a transmitter for forwarding the message to the corresponding destination device based on the proxy table,
   wherein the entry class indicates at least one of
   creation method that led to creation of the at least one proxy table entry, or
   entry maintenance behavior that the proxy node, or another device managing proxy table entries in the proxy node, applies to the at least one proxy table entry, or
   characteristics of the first resource restricted device, and
   a processor for managing the set of entries of based on the entry class, wherein the position of the at least one proxy table entry is the indication of the entry class.

16. A method for managing a proxy table at a proxy node,
   the proxy node receiving a message from a resource restricted device, said message being intended to at least one corresponding destination device,
   the proxy node checking whether the message comprises an indication that the proxy table needs to be updated with an entry for the resource restricted device for inclusion in a set of entries of the proxy table,
   the proxy node forwarding the message, and
   the proxy node refraining from creating a new entry in the proxy table based on the checking.

17. A method for managing a proxy table at a proxy node,
   (a) the proxy node receiving a message from a first resource restricted device, said message being intended to at least one corresponding destination device;
   (b) the proxy node checking whether an entry for the first resource restricted device is included in a set of entries of the proxy table, the set of entries of the proxy table indicating a set of resource restricted devices for which the proxy node does forward messages to the corresponding destination device;
   (c) in response to determining the proxy node has no entry for the first resource restricted device as a result of the checking at step (b), the proxy node buffering the message and the proxy node sending a query packet;
   (d) the proxy node receiving, in response to said query packet, a reply message comprising an indication of whether the proxy table needs to be updated; and
   (e) the proxy node creating a new entry in the proxy table depending on content of the indication in the reply message.

* * * * *